US008305994B1

(12) United States Patent
Vargantwar et al.

(10) Patent No.: US 8,305,994 B1
(45) Date of Patent: Nov. 6, 2012

(54) ACCESS PROBE HANDOFF BETWEEN CARRIERS FOR A MULTI-CARRIER SCENARIO

(75) Inventors: Sachin R. Vargantwar, Overland Park, KS (US); Manoj Shetty, Overland Park, KS (US); Bhagwan Singh Khanka, Lenexa, KS (US); Jasinder Pal Singh, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 609 days.

(21) Appl. No.: 12/488,729

(22) Filed: Jun. 22, 2009

(51) Int. Cl.
*H04Q 7/00* (2006.01)
(52) U.S. Cl. ........................................... 370/331
(58) Field of Classification Search .................. None
See application file for complete search history.

(56) References Cited

U.S. PATENT DOCUMENTS

| 5,909,491 | A | * | 6/1999 | Luo | 380/270 |
| 6,216,004 | B1 | | 4/2001 | Tiedemann, Jr. et al. | |
| 7,254,138 | B2 | * | 8/2007 | Sandstrom | 370/412 |
| 2008/0107120 | A1 | * | 5/2008 | Willhite et al. | 370/395.41 |
| 2008/0151880 | A1 | * | 6/2008 | Willhite et al. | 370/359 |

* cited by examiner

*Primary Examiner* — Hassan Phillips
*Assistant Examiner* — Prenell Jones

(57) ABSTRACT

Systems, computer-readable storage media, and methods are disclosed for providing wireless voice communication transmissions between a mobile unit and at least one base station. An illustrative method may comprise receiving an access request from a mobile unit. Based on information extracted form the access request and protocols for selecting a communication channel, identifying a selected communication channel for transmissions between the mobile unit and the base station. In the event of congestion or poor RF quality on the selected communication channel, where multiple communication channels associated with a home network are available at a base station, the mobile unit will attempt to access an alternate communication channel before going to a roaming network.

20 Claims, 5 Drawing Sheets

US 8,305,994 B1

ACCESS PROBE HANDOFF BETWEEN CARRIERS FOR A MULTI-CARRIER SCENARIO

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

When a mobile unit attempts to gain access to a wireless network, the mobile unit sends a series of access requests consisting of access probes to available base stations in the coverage area of the mobile unit. Typically, it is preferred that the mobile unit gains access to a home network instead of a roaming network to reduce the cost associated with roaming to the mobile unit user and wireless communications provider. Generally, when access requests between a mobile unit and a base station associated with a home network are unsuccessful, the access requests are redirected to a base station associated with a roaming network. Such a redirection to a roaming network can occur when the assigned channel of a mobile unit with the home network base station is congested, even if other channels available on the home network base station are not congested. Additionally, redirection to a roaming network can occur when there is poor Radio Frequency (RF) signal quality between the mobile unit and a home network base station. The present invention facilitates reducing roaming cost by enabling transmissions between a mobile unit and a base station to be redirected from a congested or poor RF quality home network communication channel to a secondary non-congested home network communication channel.

In a first illustrative aspect, at least one computer-readable storage medium having computer-executable instructions embodied thereon, when executed by a computer processor, performs a method for signal acquisition in a wireless voice communication system between a mobile unit and a base station. The method may comprise receiving an access request from the mobile unit, the access request comprising mobile unit data; extracting mobile unit data from the access request; identifying available communication channels between the base station and the mobile unit; utilizing the mobile unit data and network access control rules to select an available communication channel in response to the access request; sending from the base station to the mobile unit a control message that specifies the selected communication channels available for transmissions to the mobile unit; and in response to congestion or poor RF quality on the first communication channel, switching to a non-congested communication channel.

In a second illustrative aspect, at least one computer-readable medium having computer-executable instructions embodied thereon, when executed by a computer processor, performs a method for signal acquisition in a wireless voice communication system between a mobile unit and a base station. The method may comprise transmitting an access request from the mobile unit to a base station, the access request comprising mobile unit data; receiving at the mobile unit a control message from the base station, the control message comprising network-base station data; extracting network-base station data from the control message, the network-attribute data including an identification of a communication channel available for transmissions between the mobile unit and the base station; utilizing the network-base station data and network access control rules to select an available communication channel for transmissions between the mobile unit and the base station; sending from the mobile unit to the base station a message that specifies the selected communication channels available for transmissions to the mobile unit; and in response to congestion or poor RF quality on the first communication channel, switching to a non-congested communication channel.

In a third illustrative aspect, a system for providing wireless voice communication transmissions between a mobile unit and a base station The system may comprise a mobile unit for transmitting an access request from the mobile unit to the base station and for receiving a control message from the base station. The access request may comprise mobile unit data and the control message may comprise network-base station data. The system may further comprise a base station controller having: a receiving component, for receiving access requests from the mobile unit; an extracting component, for extracting mobile unit data from the access request; an identification component that identifies available communication channels for transmissions between the base station and the mobile unit and utilizes the mobile unit data and a set of network access control rules to select an available communication channel in response to the access request; a messaging component for sending from the base station to the mobile unit a control message that specifies the selected communication channels available for transmissions to the mobile unit; and switch component that in response to congestion or poor RF quality on the first communication channel switches transmissions between the mobile unit and the base station to a non-congested communication channel.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
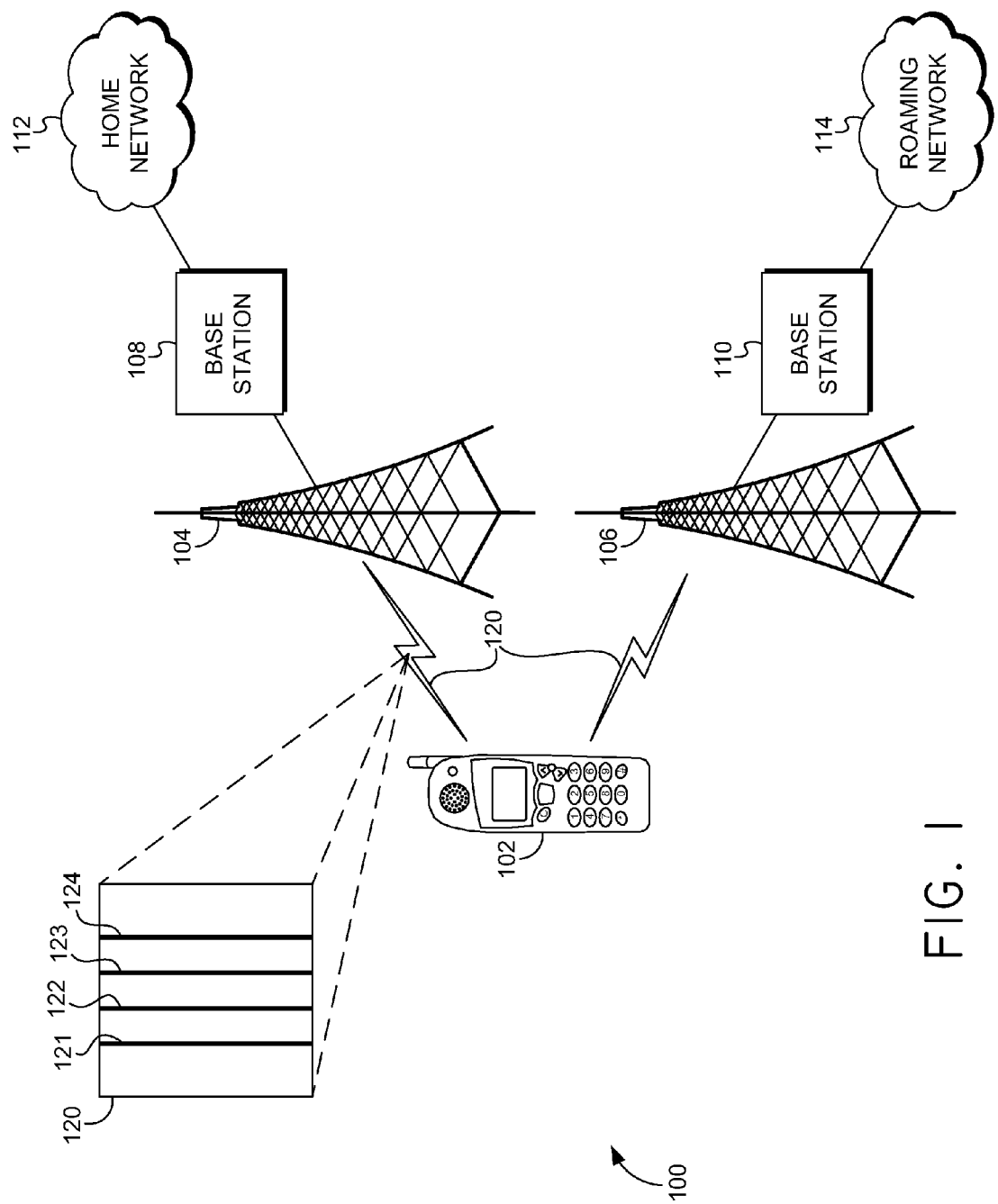
FIG. 1 depicts an illustrative wireless networking environment suitable for practicing an embodiment of the present invention.

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies. Although the terms "step" and/or "block" or "module" etc. might be used herein to connote different components of methods or systems employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms and shorthand notations:

| | |
|---|---|
| CD | Compact Disc |
| | Code Division Multiple Access |
| CD-ROM | Compact Disk Read Only Memory |
| DVD | Digital Versatile Discs |
| EEPROM | Electrically Erasable Programmable Read Only Memory |
| GSM | Global System for Mobile Communications |
| iDEN | Integrated Digital Enhanced Network |
| MIN | Mobile Identification Number |
| PCS | Personal Communications Service |
| PDA | Personal digital assistant |
| PMP | Portable media player |
| RAM | Random Access Memory |
| ROM | Read Only Memory |
| RF | Radio Frequency |
| TDMA | Time Division Multiple Access |
| UMTS | Universal Mobile Telecommunications Systems |

Further, various technical terms are used throughout this description. An illustrative resource that fleshes out various aspects of these terms can be found in *Newton's Telecom Dictionary* by H. Newton, 24$^{th}$ Edition (2008).

Embodiments of the present invention may be embodied as, among other things: a method, system, or set of instructions embodied on at least one computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention provide systems, methods, and computer-readable media for signal acquisition in a wireless voice communication system between a mobile unit and at least one base station. Cellular telecommunications systems represent one example of wireless voice communications system and function to provide the service of connecting mobile telecommunications customers, each having a mobile unit to other mobile telecommunications customers as well as land-based customers who are served by a common carrier public telephone network.

Referring to the drawings generally, and initially to FIG. 1 in particular, an exemplary wireless-networking environment suitable for use in implementing embodiments of the present invention is illustrated and designated generally as reference numeral 100. Wireless-networking environment 100 is but one example of a suitable wireless-networking environment and is not intended to suggest any limitation as to the scope of use or functionality of the invention. Neither should wireless-networking environment 100 be interpreted as having any dependency or requirement relating to any one or combination of components illustrated.

In wireless-networking environment 100, a mobile unit 102 is capable of communicating with a home network base station 108 and/or a roaming network base station 110 over established radio frequencies 120 through a home network communications tower 104 and/or roaming network 106 that is associated with the home network base station 108 and/or roaming network base station 110. Mobile unit 102 may take on a variety of forms, such as a mobile device, personal computer (PC); a laptop computer; a mobile phone; a personal digital assistant (PDA); a portable media player (PMP); a personal communication service (PCS) or other device that is capable of communicating via a wireless voice communication environment. Makers of illustrative mobile units include, for example, Research in Motion®, Creative Technologies Corp., Samsumg®, Apple® Computer, and the like. A mobile unit can possess, for example, a display(s), a power source(s) (e.g., a battery), a data store(s), a speaker(s), memory, a buffer(s), and the like.

Wireless-networking environment 100 may comprise a number of multiple access technologies to facilitate more than one mobile unit 102 to communicate simultaneously with each home network base station 108 and/or roaming network base station 110. The mobile unit 102 communicates by way of a wireless transceiver. A wireless transceiver serves as a transceiver for wireless communications between the mobile unit 102 and a home network base station 108 and/or roaming network base station 110. The base stations may be associated with a network, such as a home network 112 and/or a roaming network 114. The home network base station 108 and/or roaming network base station 110 communicates over a wireless air interface via home network communications tower 104 and/or roaming network communications tower 106 utilizing a wireless access network, such as Global System for Mobile Communications (GSM), General Packet Radio Service (GPRS), Code Division Multiple Access (CDMA), CDMA2000, CDMAOne, Time Division Multiple Access (TDMA), Universal Mobile Telecommunications Systems (UMTS), Integrated Digital Enhanced Network (iDEN), WiMAX, 3G, 4G, and Personal Communications Service (PDCS) and the like. Home network base station 108 and/or roaming network base station 110 may contain a base station transceiver which consists of all radio transmission and reception equipment which provide coverage to a geographic area to receive/transmit radio signals to/from the mobile unit 102 via home network communication tower 104 and/or roaming network communications tower 106. Home network base station 108 and/or roaming network base station 110 may also include a base station controller which supervises the function and control of multiple base station transceivers.

The mobile device 102 communicates with other computing devices (e.g., a mobile device(s), a server(s), a personal computer(s), etc.) utilizing a network, such as the home network 112 and/or the roaming network 114. In embodiments, each of home network 112 and/or roaming network 114 are a wireless telecommunications network. A wireless telecommunications network refers to any type of telecommunications network that is wireless. Examples of a wireless telecommunications technologies that might be compatible with the home network 112 and/or the roaming network 114 include, but are not limited to GSM, GPRS, CDMA, CDMA2000, CDMAOne, TDMA, UMTS, iDEN, WiMAX, 3G, 4G, and PDCS. A wireless telecommunications network might include an array of devices or components, which are not shown so as to not obscure more relevant aspects of the invention. Components such as a home network base station 108 and/or roaming network base station 110, home network communications tower 104 and/or roaming network communications tower 106 or even access points (as well as other components) can provide wireless connectivity in some embodiments. Home network 112 and/or roaming network 114 can include multiple networks, as well as being a network or networks, but is shown in more simple form so as to not obscure other aspects of the present invention.

The home network 112 is a wireless telecommunications network associated with a wireless telecommunications provider that provides services to the mobile unit 102. In this regard, a home network is generally used to provide services to a mobile unit when the mobile unit is within the coverage area of the home network. Such services might include voice services that enable making and receiving voice calls, data services that enable sending and receiving data, or other services provided by a wireless telecommunications provider. In embodiments, a mobile unit user enters into a contract with a wireless telecommunication provider in connection with a home network to obtain wireless services. Accordingly, the mobile unit, or user associated therewith, might be registered with the wireless telecommunications provider, or home network associated therewith, to receive wireless services.

The roaming network 114 is a wireless telecommunications network other than a home network of the mobile unit that can provide services to the mobile unit. A roaming network can be any wireless telecommunications network that a mobile unit can establish a connection with other than the home network. Generally, a roaming network can provide services (e.g., voice services and/or data services) to a mobile unit when the mobile unit is outside geographical coverage of a home network of the mobile unit. In embodiments, a wireless telecommunication provider in association with a home network contracts (e.g., via a roaming agreement) with a wireless telecommunications provider in association with a roaming network such that a mobile unit can utilize a roaming network to obtain services, for example, in instances that the mobile unit is outside of coverage of the home network. In such an embodiment, the mobile unit, or mobile unit user, might not be registered with the roaming network or the wireless telecommunications provider thereof.

Mobile unit 102 and home network base station 108 and/or roaming network base station 110 communicate via radio frequency (RF) signals 120. Each radio frequency signal 120 may include several communication channels, such as channels 121, 122, 123 and/or 124. As used herein a communication channel may include a physical or logical portion of the available bandwidth for communication within radio frequencies 120 in the wireless voice communication system 100. RF communication channels 121, 122, 123 and 124 may carry voice transmissions between the mobile unit and the base station. RF communication channels 121, 122, 123 and 124 may also convey command messages from the base station 108 and 110 to the mobile unit 102. In addition, channels 121, 122, 123 and 124 may convey access requests from mobile unit 102 to home network base station 108 and roaming network base station 110.

Figure 2:
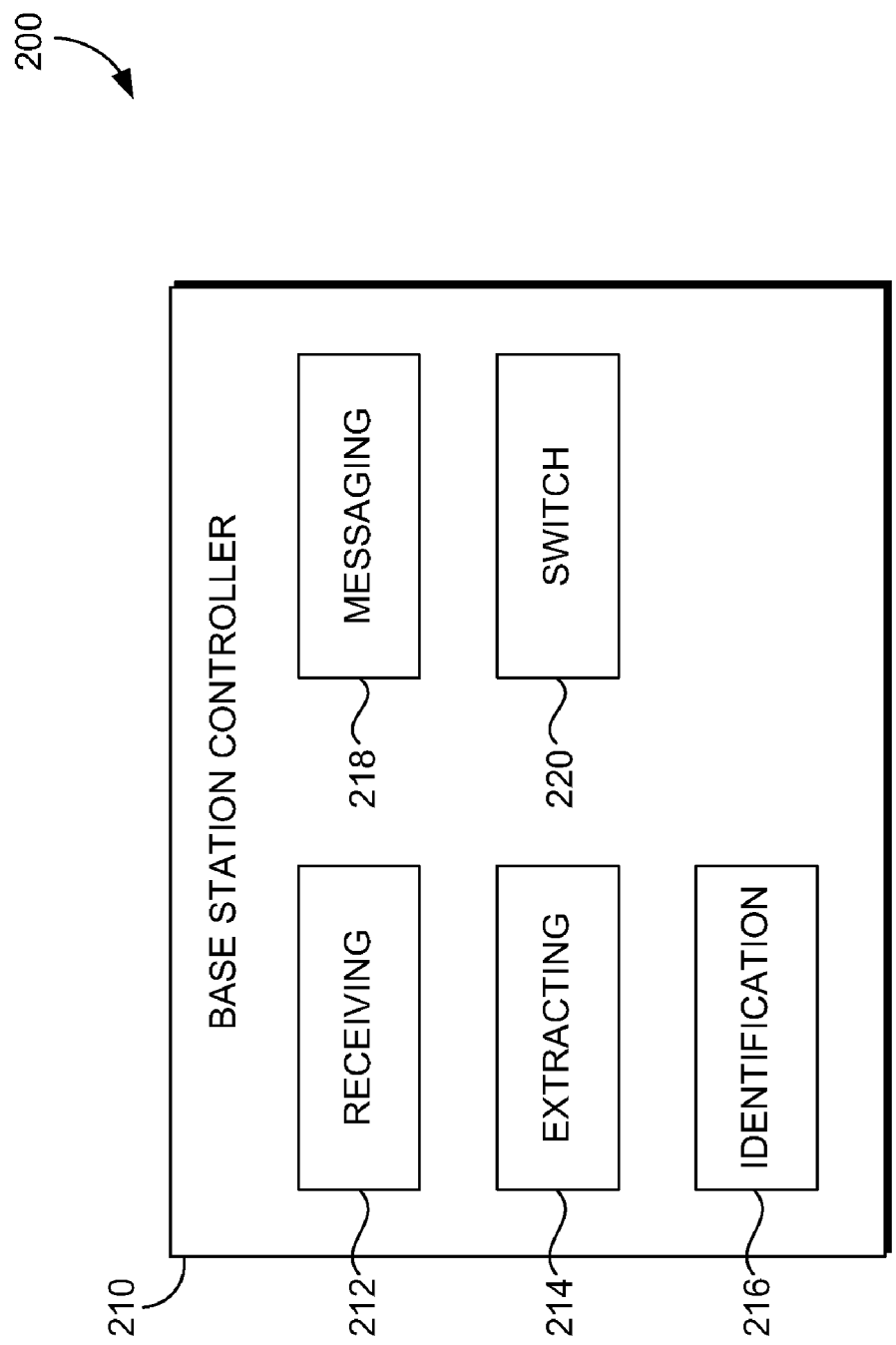
FIG. 2 is an exemplary system architecture suitable for use in implementing embodiments of the present invention.

FIG. 2 is an exemplary system architecture 200 suitable for use in implementing embodiments of the present invention. Generally, the exemplary system architecture 200 advantageously allows for a base station controller 210 to communicate with mobile units in a wireless voice communication system. Base station controller 210 may include a receiving component 212, an extracting component 214, an identification component 216, a messaging component 218 and a switch component 220. Receiving component 212 may receive access requests from a mobile unit. Access requests may comprise messages issued from a mobile unit to initiate interaction with a wireless communications network to start to transfer information. An access request may comprise a series of access probes, an access probe being each transmission of a message from a mobile unit. Generally, access probe sequences comprises a series of access probes of increasing signal strength sent from the mobile unit. The access request may include various data including mobile unit data. Mobile unit data may comprise information identifying characteristic features of the mobile unit attempting to access a wireless voice network via of base station controller 210. Examples of mobile unit data may include but are not limited to, the mobile identification number (MIN) of the mobile unit and an electronic serial number. Base station controller 210 may also include an extracting component 214 for extracting the mobile unit data from the access requests received from the mobile unit. Identification component 216 of base station controller 210 may identify the RF communication channels available for transmissions between the base station controller and the mobile unit. In one embodiment, the identification component may continuously monitor the RF communication channels associated with the home network to determine the capacity of the one or more channels to transmit information between mobile units and the base station associated with the home network. In other embodiments, the identification component 216 may identify the RF channels available for transmissions after a triggering event, including but not limited to the receipt of an access request from a mobile unit.

Identification component 216 may use the mobile unit data obtained from extracting component 214 along with a set of network access control rules to select an RF communication channel in response to an access request from a mobile unit. As used herein, network access control rules refer to methods for allocating the resource of an available RF communication channel to a mobile unit in response to an access request. An example of a network access control rule is a hashing algorithm that takes as input a mobile identification number (MIN) and/or mobile electronic serial number to assign a mobile unit sending an access request to the base station controller 210, to a particular RF communication channel.

Base station controller 210 may also comprise a messaging component 218 for sending instructions from the base station to a mobile unit. Messaging component 218 may transmit a control message to the mobile unit in response to an access request. A control message may comprise network access information and network environment information. Additionally, the control message may include a list of RF communication channels that are available for transmissions between the mobile unit and the base station. The control message may also comprise instructions directing the mobile unit to transmit and/or receive information on a specific RF communication channel from set of communication channels.

Base station controller 210 may also comprise a switch component 220. Switch component 220 may facilitate various handoffs. Typically, a handoff in a wireless telecommunications system is a procedure where a base station providing service to a mobile unit changes from a current first base station to a new second base station while maintaining a wireless link between the mobile unit and the base stations and not disconnecting the link while the mobile unit moves into a new cell outside of the coverage of the current cell. In addition to facilitating traditional handoffs, switch component 220 may also facilitate a handoff of a mobile unit access request from one RF communication channel associated with the base station to another RF communication channel associated with the same base station. In one embodiment, in response to congestion or poor RF quality on a first communication channel associated with a base station of a home network, the switch component 220 may transfer transmissions between the mobile unit and the base station to a second non-congested communication channel associated with the same base station of the home network. In a further embodiment, switch component 220 may transfer transmissions including access requests from a mobile unit, from one communication channel associated with a base station to another communication channel after a series of failed access probes by the mobile station. By way of example, the component 220 may switch communication channels using a scheduling algorithm such as a round-robin schedule whereby access probes are transferred to a secondary communication channel in a sequential manner after a predetermined number of failed access requests on a particular communication channel. In another embodiment, after a predetermined number of failed access requests or upon a dissociation event between a mobile unit and an base station communicating of a particular RF communication channel, component 220 may switch communication channels to a default secondary communication channel. Switch component 220 may also redirect transmissions between the mobile unit and base station from a congested or poor RF quality communication channel to the communication channel with the least interference or congestion at the time of the switch. By way of example, poor RF quality on a communication channel may be attributed to external interference at the communication tower or mobile unit. Additionally, poor RF quality may be attributed to the communication channel experiencing an amount of traffic that exceeds the load capacity of the communication channel.

Figure 3:
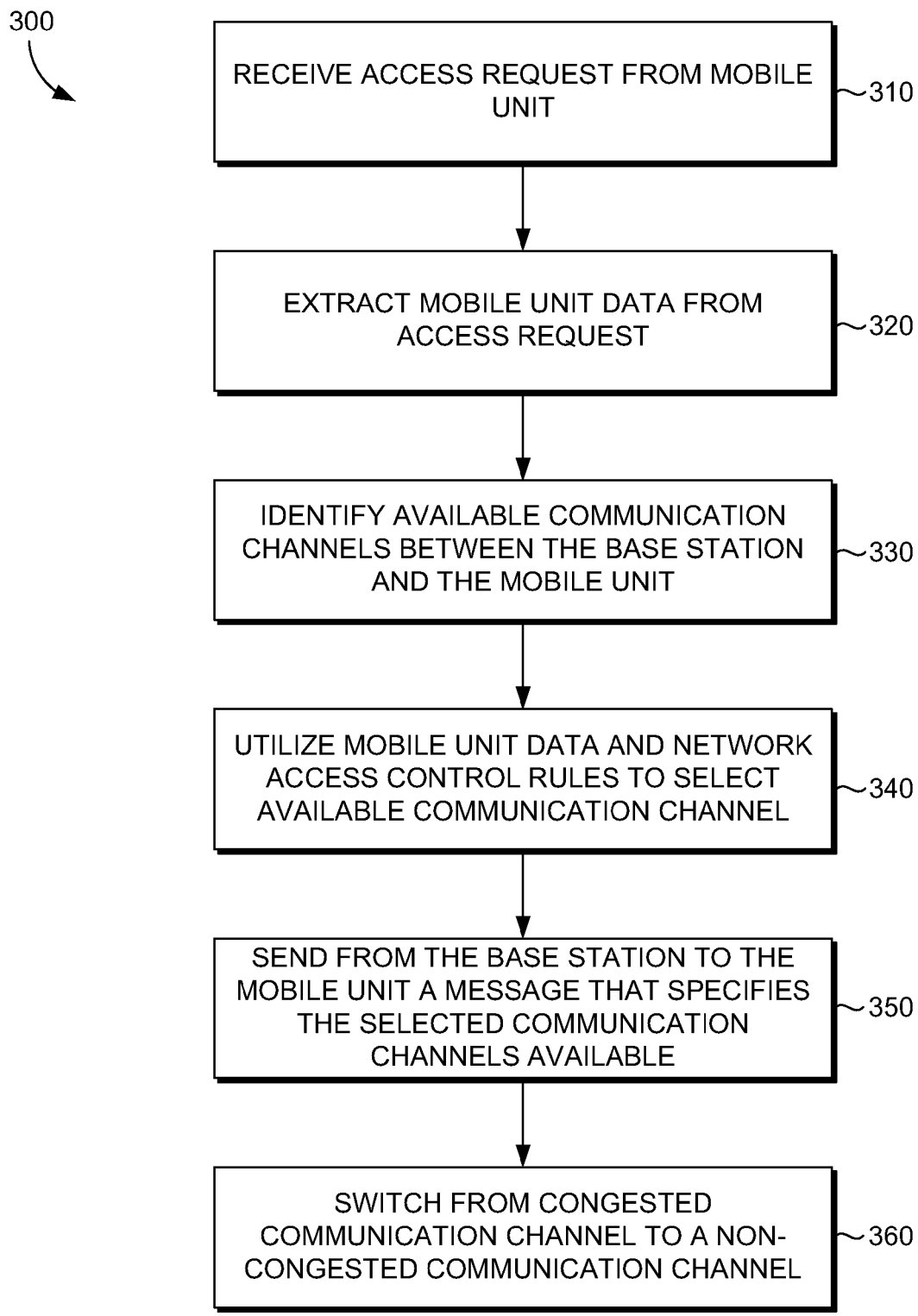
FIG. 3 depicts a flow diagram of an exemplary method for signal acquisition in a wireless voice communication system between a mobile unit and a base station, in accordance with an embodiment of the present invention.

By way of example, with reference to FIG. 3, an illustrative method for signal acquisition in a wireless voice communication system between a mobile unit and an base station in accordance with an embodiment of the present invention is provided and referenced generally by the numeral 300. At step 310, at least one access request is received at a base station controller from a mobile unit. In one embodiment, the access request is received at a base station associated with a home network via a home network communication tower. At step 320, mobile unit data is extracted from the access request. The mobile unit data may comprise information identifying characteristic features of the mobile unit such the MIN number. At step 330, the RF communication channels available for transmissions between the base station mobile unit are identified. In one embodiment, a base station is associated with at least two RF communication channels. The number of RF communication channels available at a particular base station may very depend on the geographical location of the base station. For example a base station located in a metropolis having a large about of mobile unit users demanding access to a home network, may have up to five or six RF communication channels. At step 340, the mobile unit data and a set of network access control rules are used by the base station controller to select one of the identified available RF communication channels for transmissions between the base station and the requesting mobile unit. In one embodiment, the network access control rules may include using a hashing algorithm to randomly assign a mobile unit to a RF communication channel based on the MIN number of the mobile unit. At step 350, a control message is sent to the mobile unit. The control message identifies the RF communication channel designated for transmissions between the mobile unit and the base station. At step 360, access requests including transmissions between the base station and mobile unit are redirected to a first communication channel to a second channel. The transmissions may be switched from one communication channel to another channel in response to congestion or poor RF quality on the first communication channel. In one embodiment, when sufficient interference is detected on a particular RF communication channel to cause a series of access request to fail, the base station controller redirects the access requests from one communication channel to a randomly assigned second RF communication channel associated with the base station. In another embodiment, the switch between RF communication channels may occur using a scheduling algorithm such as a round-robin schedule whereby access request are transferred to successive communication channels until the mobile unit successfully acquires the home network.

Figure 4:
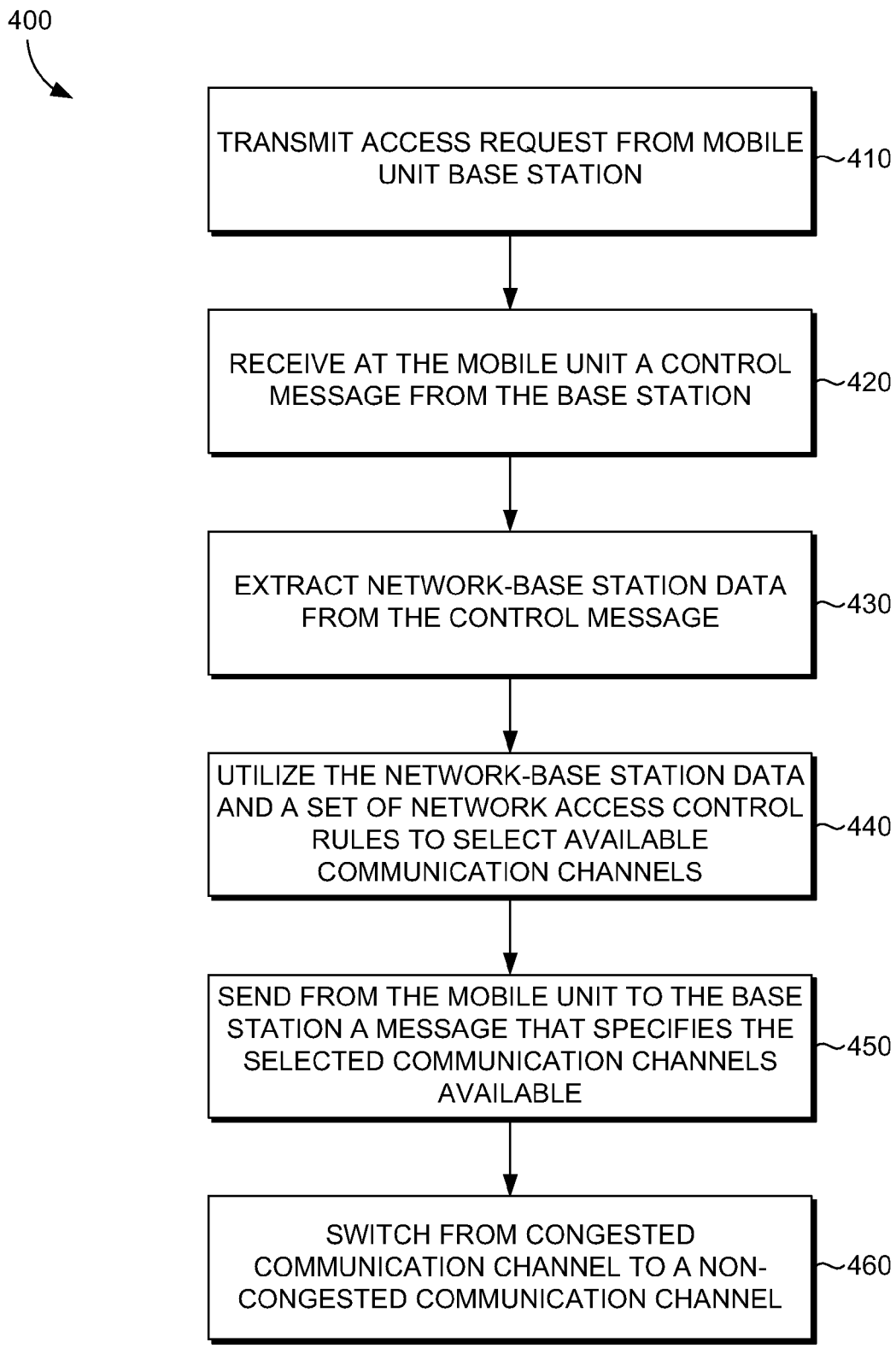
FIG. 4 depicts a flow diagram of an exemplary method for signal acquisition in a wireless voice communication system between a mobile unit and a base station, in accordance with an embodiment of the present invention.

With reference to FIG. 4, an illustrative method for signal acquisition in a wireless voice communication system between a mobile unit and an base station in accordance with an embodiment of the present invention is provided and referenced generally by the numeral 400. At step 410, at least one access request is transmitted from a mobile unit to a base station associated with a wireless network, preferably a home network. At step 420, the mobile unit receives a control message from a base station. The control message may comprise information regarding the environmental conditions of the wireless network the mobile unit is attempting to access. For example, the control message may include data related to the load capacity of the various communication channels available at the base station. Additionally, the control message may include a list of RF communication channels that are available for transmissions between the mobile unit and the base station. The control message may also include instructions directing the mobile unit to transmit/receive information on a specific RF communication channel from set of communication channels. At step 430, network-base station data is extracted from the control message. The network-base station data may include an identification of one or more communication channels available for transmissions between the mobile unit and the base station.

At step 440, the network-base station data and a set of network access control rules are used by the mobile unit to select one of the identified available communication channels for transmissions between the base station and the requesting mobile unit. In one embodiment, the network access control rules may include using a hashing algorithm to randomly assign a mobile unit to a communication channel based on the MIN number of the mobile unit. At step 450, a message is sent from the mobile unit to the base station controller. The message identifies the communication channel selected for transmissions between the mobile unit and the base station. At step 460, access requests and transmissions between the base station and mobile unit are redirected from a first communication channel to a second channel. The transmissions may be switched from one communication channel to another channel in response to congestion or poor RF quality on the first communication channel. In one embodiment, the switch of communication channels may occur using a scheduling algorithm such as a round-robin schedule whereby access requests are transferred to successive RF communication channels until a the mobile unit successfully acquires the home network. In another embodiment, the switch to an alternative communication channel may involve random selection of an RF communication channel associated with the base station of the home network.

Figure 5:
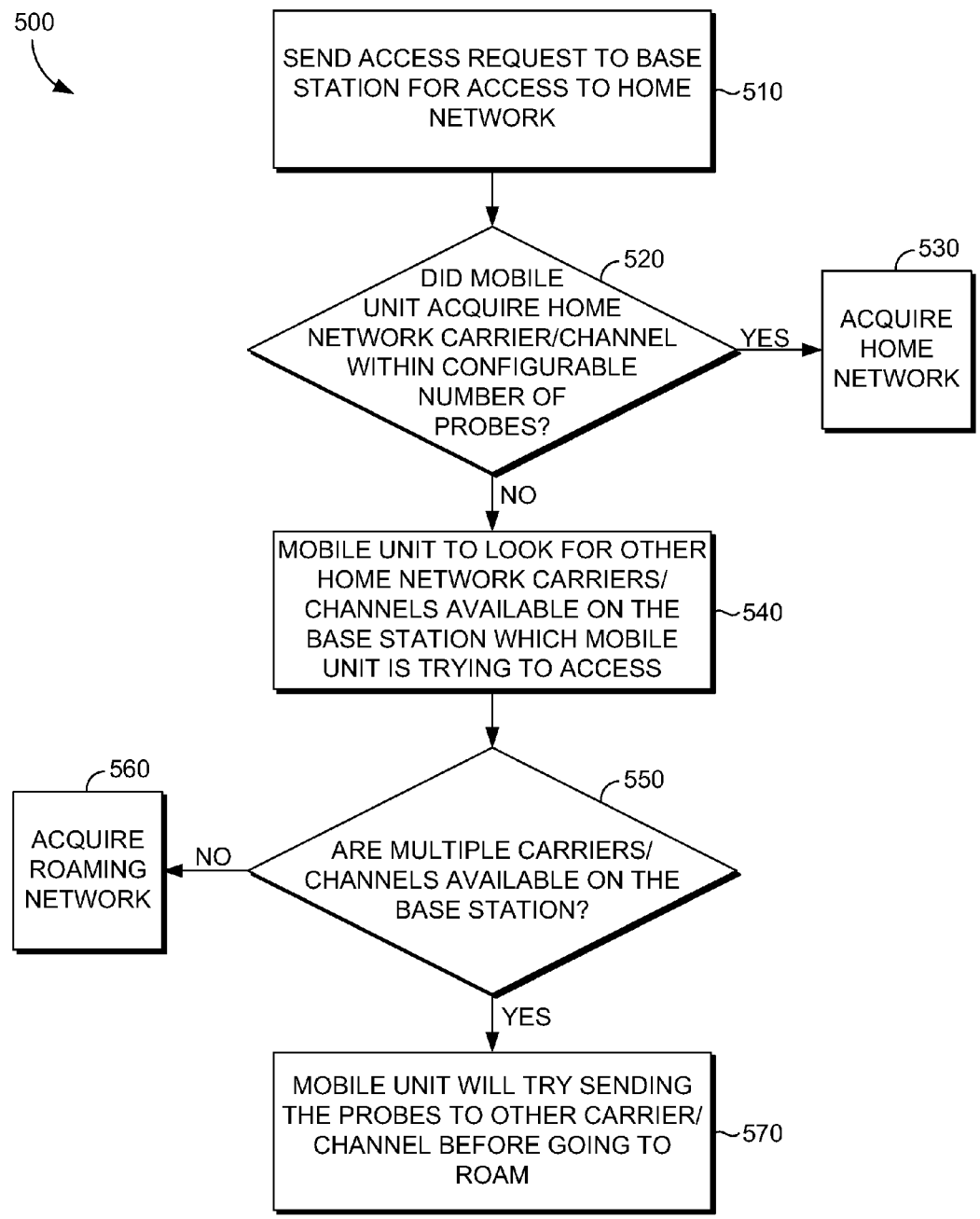
FIG. 5 depicts a flow diagram of a illustrating a further exemplary method for signal acquisition in a wireless voice communication system between a mobile unit and a base station, in accordance with an embodiment of the present invention.

With reference to FIG. 5, an illustrative method for signal acquisition in a wireless voice communication system between a mobile unit and an base station in accordance with an embodiment of the present invention is provided and referenced generally by the numeral 500. When a mobile units is attempting to gain access to a wireless network, the mobile unit typically sends a series of access requests consisting of access probes and/or a sequence of access probes to available base stations in the coverage area of the mobile unit. Typically, it is preferred that the mobile unit gains access to a home network instead of a roaming network to reduce the cost to the mobile unit user and/or wireless communications provider associated with roaming. The strength of the access probes sent from the mobile unit typically increase with each probe in an access probe sequence. The number of probes comprising an access request may be limited to preserve the battery life of the mobile unit. Initially, as indicated at step 510, at least one access request is sent to a base station for access to a home network. At step 520, it is determined whether the mobile unit acquired access to an RF communication channel or carrier associated with the home network. It is also determined if the mobile unit gained access to the home network within a configurable number of access probes. That is, a determination might be made as to whether the home network is available to provide service to the mobile unit. Such a determination might be made for example, if a control message from a base station associated with the home network is sent to mobile unit. The control message may indicate that access to the home network is granted, and that the mobile unit is allowed to transmit/receive information to/from the base station on a particular communication channel.

If it is determined at step 520 that the mobile unit acquired a RF communication channel associated with the home network within the specified number of access probes, the mobile unit acquires access to the home network at step 530. If, however, it is determined that the mobile unit has not acquired a RF communication channel associated with the home network within the specified number of access probes, the mobile unit is instructed to look for other RF communication channels associated with the home network available on the base station which the mobile unit is trying to access. This is indicated at step 540. The number of RF communication channels available at a particular base station may very depend on the geographical location of the base station. For example, a base station located in a metropolis having a large about of mobile unit users demanding access to a home network may have up to five or six RF communication channels per base stations. At step 550, it is determined whether multiple home network RF communication channels are available on the base station. If it is determined that multiple home network RF communication channels are not available on the base station, the method proceeds to step 560. At step 560, the mobile unit acquires access to a roaming network. If however, it is determined that the base station has multiple RF communication channels associated with the home network, the mobile unit will try sending the access probes to the other channels before going to roam. This is indicated at step 570. As can be appreciated, the protocol for sending the access probes may vary. By way of example only, access probes may be sent to random alternative RF communication channels available on the home network. In another embodiment, the access probes may be sent to alternative home network RF communication channels using a scheduling algorithm such as a round-robin schedule whereby access probes are transferred to a secondary RF communication channel in a sequential manner until a successful access attempt to the home network is achieved. In another embodiment, access probes may be redirected to a pre-selected default secondary communication channel associated with the home network. In yet another embodiment, access probes may be directed to the home network RF communication channel having the least interference or congestion.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. At least one non-transitory computer-readable storage medium having computer-executable instructions embodied thereon that, when executed by a computer processor, perform a method for signal acquisition in a wireless voice communication system between a mobile unit and at least one base station, the method comprising:

receiving at least one access request from the mobile unit, the access request comprising at least mobile unit data;

extracting mobile unit data from the at least one access request;

identifying at least two available communication channels between the at least one base station and the mobile unit;

utilizing the mobile unit data and a set of network access control rules to select an available communication channel in response to the at least one access request;

sending from the base station to the mobile unit a control message that specifies the selected communication channels available for transmissions to the mobile unit; and in response to at least one of congestion and poor RF quality on the first communication channel, switching to a non-congested communication channel.

2. The non-transitory computer-readable storage medium of claim 1, wherein the access requests comprise a plurality of access probes.

3. The non-transitory computer-readable storage medium of claim 1, wherein the mobile unit data comprises at least one of a mobile identification number, and an electronic serial number.

4. The non-transitory computer-readable storage medium of claim 1, wherein the set of network access control rules includes a hashing algorithm.

5. The non-transitory computer-readable storage medium of claim 1, wherein the control message includes a list of RF communication channels that are available for transmissions between the mobile unit and the base station.

6. The non-transitory computer-readable storage medium of claim 5, wherein the control message includes a carrier assignment message, wherein the carrier assignment message identifies RF communication channel designated for transmissions between the mobile unit and the base station.

7. The non-transitory computer-readable storage medium of claim 1, wherein switching to a non-congested channel involves protocols for sending access request to a non-congested channel.

8. The non-transitory computer-readable storage medium of claim 7, wherein switching the protocol for sending transmissions to a non-congested channel involves sending the access request to a randomly selected alternative communication channel.

9. The non-transitory computer-readable storage medium of claim 7, wherein switching the protocol for sending transmissions to a non-congested channel involves sending the access request to a set of alternative communication channels using a scheduling algorithm such as a round-robin schedule.

10. The non-transitory computer-readable storage medium of claim 7, wherein switching the protocol for sending transmissions to a non-congested channel involves sending the access request to a pre-selected default secondary communication channel.

11. The non-transitory computer-readable storage medium of claim 7, wherein switching the protocol for sending transmissions to a non-congested channel involves sending the access request to the communication channel having the least interference or congestion.

12. At least one non-transitory computer-readable medium having computer-executable instructions embodied thereon that, when executed by a computer processor, perform a method for signal acquisition in a wireless voice communication system between a mobile unit and at least one base station, the method comprising:
- transmitting at least one access request from the mobile unit to the at least one base station, the access request comprising at least mobile unit data;
- receiving at the mobile unit a control message from the base station, the control message comprising at least network-base station data;
- extracting network-base station data from the control message, the network-base station data including an identification of at least one communication channel available for transmissions between the mobile unit and the base station;
- utilizing the network-base station data and a set of network access control rules to select at least one available communication channel for transmissions between the mobile unit and the base station;
- sending from the mobile unit to the base station a message that specifies the selected communication channels available for transmissions to the mobile unit; and
- in response to at least one of congestion and poor RF quality, switching to a non-congested communication channel.

13. The non-transitory computer-readable storage medium of claim 12, wherein switching to a non-congested channel involves protocols for sending access request to a non-congested channel.

14. The non-transitory computer-readable storage medium of claim 13, wherein switching the protocol for sending transmissions to a non-congested channel involves sending the access request to a randomly selected alternative communication channel.

15. The non-transitory computer-readable storage medium of claim 13, wherein switching the protocol for sending transmissions to a non-congested channel involves sending the access request to a set of alternative communication channels using a scheduling algorithm such as a round-robin schedule.

16. The non-transitory computer-readable storage medium of claim 13, wherein switching the protocol for sending transmissions to a non-congested channel involves sending the access request to a pre-selected default secondary communication channel.

17. The non-transitory computer-readable storage medium of claim 13, wherein switching the protocol for sending transmissions to a non-congested channel involves sending the access request to the communication channel having the least interference or congestion.

18. A system for providing wireless voice communication transmissions between a mobile unit and at least one base station, the system comprising:
- a mobile unit for transmitting at least one access request from the mobile unit to the at least one base station, the access request comprising at least mobile unit data and for receiving a control message from the base station, the control message comprising at least network-base station data; and
- a base station controller comprising:
    - a receiving component, for receiving the at least one access request from the mobile unit;
    - an extracting component, for extracting mobile unit data from the at least one access request;
    - an identification component that identifies at least two available communication channels for transmissions between the at least one base station and the mobile unit and utilizes the mobile unit data and a set of network access control rules to select an available communication channel in response to the at least one access request;
    - a messaging component for sending from the at least one base station to the mobile unit a control message that specifies the selected communication channels available for transmissions to the mobile unit; and
    - switch component that in response to at least one of congestion and poor RF quality on the first communication channel switches transmissions between the mobile unit and the at least one base station to a non-congested communication channel.

19. The system of claim 18, wherein the switch component send transmissions to a non-congested channel by sending the access request to the communication channel having the least interference or congestion.

20. The system of claim 18, wherein the switch component send transmissions to a non-congested channel by sending the access request to a randomly selected alternative communication channel.

* * * * *